United States Patent
Sloan et al.

(10) Patent No.: US 7,397,588 B2
(45) Date of Patent: Jul. 8, 2008

(54) GENERATION OF HUE SLICE TABLE FOR GAMUT MAPPING

(75) Inventors: Rocklin J. Sloan, San Jose, CA (US); John S. Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 749 days.

(21) Appl. No.: 11/047,299

(22) Filed: Jan. 31, 2005

(65) Prior Publication Data

US 2006/0170999 A1 Aug. 3, 2006

(51) Int. Cl.
*G03F 3/08* (2006.01)
(52) U.S. Cl. ............... 358/520; 358/1.9; 358/518; 358/3.23; 345/601; 348/649
(58) Field of Classification Search ............... 358/1.9, 358/3.01, 3.23, 518, 520; 382/167; 345/594, 345/600, 601; 348/649
See application file for complete search history.

(56) References Cited

U.S. PATENT DOCUMENTS

| | | | | |
|---|---|---|---|---|
| 5,943,059 A | * | 8/1999 | Satoh et al. | 345/601 |
| 5,953,499 A | * | 9/1999 | Narendranath et al. | 358/1.9 |
| 6,225,974 B1 | | 5/2001 | Marsden et al. | 345/150 |
| 6,340,975 B2 | | 1/2002 | Marsden et al. | 345/590 |
| 6,441,869 B1 | * | 8/2002 | Edmunds | 348/651 |
| 6,618,499 B1 | | 9/2003 | Kohler et al. | 382/162 |
| 2003/0072016 A1 | * | 4/2003 | Dalrymple et al. | 358/1.9 |
| 2004/0109180 A1 | | 6/2004 | Braun et al. | 358/1.9 |
| 2004/0165771 A1 | * | 8/2004 | Russell et al. | 382/167 |
| 2004/0165772 A1 | * | 8/2004 | Russell et al. | 382/167 |
| 2005/0041155 A1 | * | 2/2005 | Braun | 348/649 |
| 2007/0126933 A1 | * | 6/2007 | Ting | 348/649 |
| 2007/0127074 A1 | * | 6/2007 | Hayaishi | 358/518 |
| 2007/0211177 A1 | * | 9/2007 | Lee et al. | 348/649 |
| 2008/0043260 A1 | * | 2/2008 | Ramanath et al. | 358/1.9 |

* cited by examiner

*Primary Examiner*—Kimberly A Williams
(74) *Attorney, Agent, or Firm*—Fitzpatrick, Cella, Harper & Scinto

(57) ABSTRACT

A table representing a color gamut for a device for use in a color management system where colors are represented in a color appearance space comprises data representing a collection of hue slices through a boundary surface of the color gamut. The collection of hue slices comprises entries for vertex point hue slices obtained at each vertex point on the boundary surface of the color gamut, and entries obtained for additional hue slices between adjoining vertex point hue slices, where a number of the additional hue slices is determined such that there is no more than a specified angular difference between each hue slice. Each hue slice is represented by a hue value and a collection of hue slice points each containing a lightness value and a chroma value. The hue slice points of each hue slice are ordered in the table based on an angular altitude of each point, the angular altitude of each point being determined between a lightness axis of the color gamut and a vector projected from a midpoint of the lightness axis to the hue slice point.

20 Claims, 16 Drawing Sheets

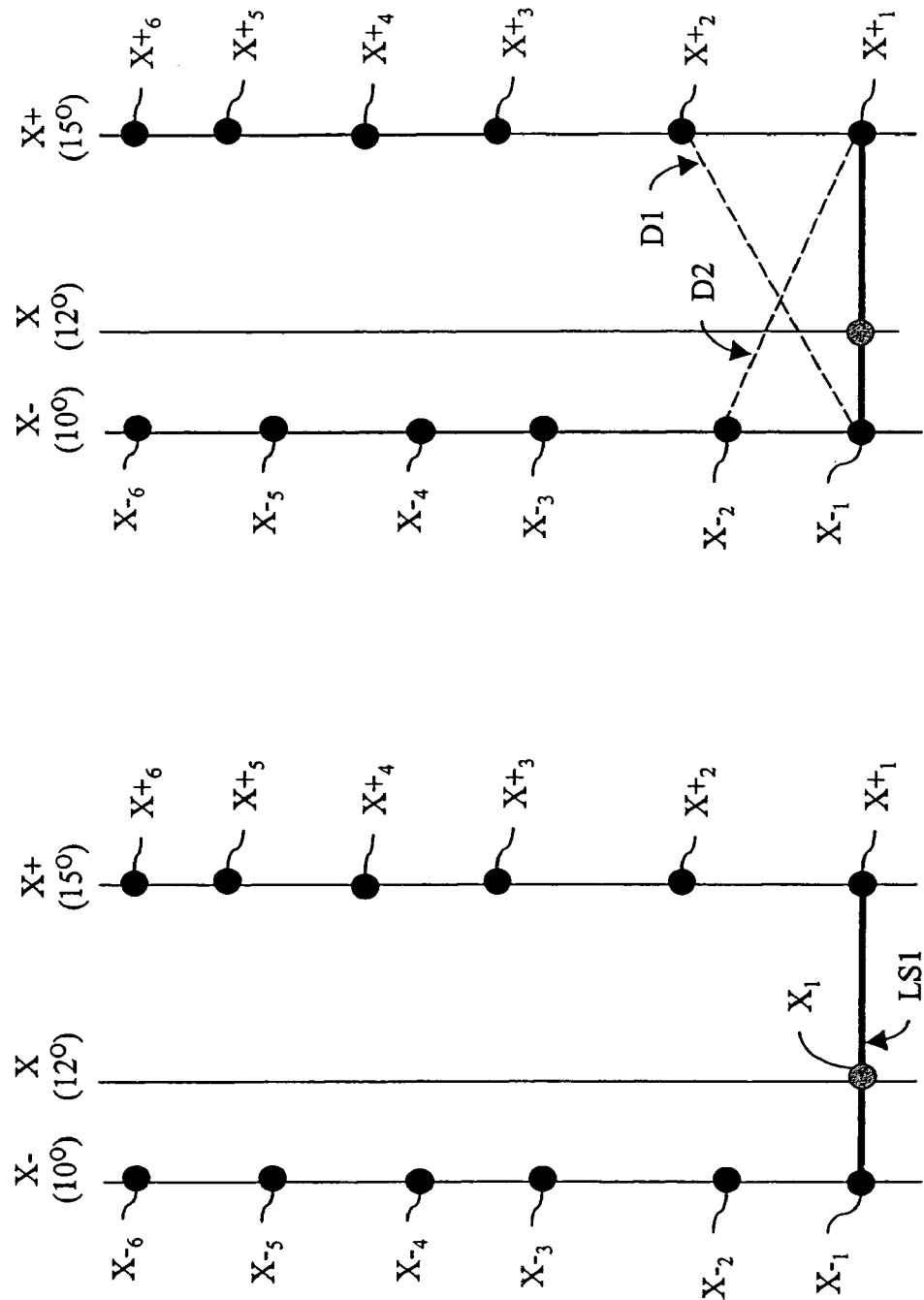

US 7,397,588 B2

GENERATION OF HUE SLICE TABLE FOR GAMUT MAPPING

BACKGROUND OF THE INVENTION

1. Field of the Invention

The present invention generally relates to generation of a hue slice table for use in gamut mapping, and extraction of a hue slice from the generated table. In more detail, the present invention generates a hue slice table by obtaining hue slices at each vertex point on a boundary surface of a device's color gamut and then generating additional hue slices between the vertex point hue slices to fill-in the table. In generating each hue slice, the invention utilizes a point ordering technique that results in a more accurate representation of each slice. Once the table is generated, the invention provides a unique linear interpolation extraction technique to obtain a hue slice from the table if a hue slice at a requested hue angle does not already exist in the table.

2. Description of the Related Art

Gamut mapping relates to image reproduction from one imaging device to another, such as reproducing an image displayed on a color monitor as a printed image printed by a color printer. To reproduce the image, the color gamut (a range of producible colors) of a source device (such as the color monitor) needs to be mapped to the color gamut of a destination device (such as the printer).

Colors in a color management system are represented in a color appearance space (e.g., CIECAM). For gamut mapping, colors are mapped to appearance space Jch. There are generally two representations of this space: Cartesian (Jab), wherein "a" corresponds to red-green and "b" corresponds to blue-yellow, and cylindrical (Jch), where "h" represents an angular position around the "J" axis and "c" (chroma) represents a Euclidean distance from the "J" axis. The "J" axis represents lightness in both spaces. The foregoing has been described in detail by the CIE (Commission Internationale de l'Écairage/International Commission on Illumination).

Generally, although not always, the color gamut of the source device may be larger than the color gamut of the destination device. Thus, although some portions of each color gamut overlap one another, other portions of the larger gamut are outside that of the smaller gamut. Therefore, colors in the larger gamut that fall outside the smaller gamut need to be compressed so that these out-of-gamut colors can be reproduced by the destination device. As such, it is often necessary to map colors between two devices that have different sized gamuts. For example, it may be necessary to map colors from a color monitor that uses a large color space, such as Adobe RGB color space, to a printer that uses a subtractive colorant space, such as CMYK.

Various techniques have been utilized in performing gamut mapping so as to reproduce colors as accurately as possible. Some conventional techniques utilize a hue slice look-up table in a lightness (J), chroma (c), hue (h) coordinate system. A hue-slice look-up table generally contains hue slices that are formed by the intersection of a plane though the lightness axis and the gamut surface at various hue angles (ranging from 0 to 360 degrees, where angles near 30 degrees appear reddish, angles near 210 degrees appear greenish, etc.) In this technique, hue slices are taken through the gamut at a predetermined fixed number of hue angles so as to attempt to approximate the full surface boundary via individual hue slices. If a hue slice other than one of the predetermined number of hue slices is to be extracted from the table, it is obtained by interpolation between the predetermined slices.

As can readily be understood, when the number of hue slices contained in the table increases, the accuracy of the representation of the gamut boundary also increases, as does the accuracy of values obtained by interpolation. Thus, it is preferable to populate the hue slice table with a sufficient number of hue slices so as to obtain the best possible accuracy in the gamut representation.

One conventional method of generating a hue slice look-up table divides a device's gamut into a fixed number of segments. For example, the gamut may be divided into 16 equally-spaced three-dimensional hue sectors about a lightness (J) axis (similar to cutting a sphere into 16 equal sectors), and each sector is divided into 16 segments. Thus, the gamut is divided into 256 (16×16) separate segments. In generating the hue slice table, each segment is analyzed to find a point of maximum chroma within the segment. Once the maximum chroma point is found within the segment, a hue slice is obtained at the hue of the maximum chroma point and the obtained hue slice is inserted into the table. The same process is performed for each segment with the resulting hue slice being inserted into the table. Thus, the foregoing conventional technique generates a hue slice look-up table with a fixed size and with a fixed number of elements.

The foregoing technique does, however, suffer from some problems. One problem is that, since only a maximum chroma point is obtained for each segment, other chroma points of interest (e.g., other chroma points on the boundary surface) within the segment can be missed. Thus, when it is necessary to use interpolation to map a point that falls between hue slices in the table, the interpolated result may not be a very accurate representation of the boundary surface. Accordingly, what is needed is a way to generate a hue slice table that can capture more chroma points of interest so that the hue slices in the table form a more accurate representation of the gamut boundary surface.

Another aspect of the invention lies in ordering of hue slice points when the points are inserted into the hue slice look-up table. Conventionally, once hue slice points for a hue slice are determined, they are placed in the look-up table in either ascending or descending order based on lightness values. However, in some instances, the darkest point that falls on the lightness axis in a hue slice may not actually be the darkest point in the hue slice. As a result, sorting the hue slice points by lightness values would result in an erroneous representation of the gamut boundary since the darkest point would be out of order relative to the darkest point on the lightness axis. Thus, what is needed is a better way to order hue slice points so they will accurately represent the gamut boundary surface, regardless of their lightness values.

SUMMARY OF THE INVENTION

The present invention addresses the foregoing by generating a hue slice look-up table that is variable in size and that has a variable number of elements. According to the invention, hue slices are taken through a device's color gamut boundary surface, which is formed of a collection of co-planar geometrical shapes (such as triangles) so as to form a closed surface which represents the gamut boundary. In obtaining the hue slices, vertex points formed on the surface of the gamut by the triangles are found and a hue angle for each of the obtained vertex points is determined. Then, at each of the determined hue angles, hue slice points that represent the hue slice and that are to be inserted into the hue slice look-up table are determined as follows.

At each vertex point, a planar surface is generated through a neutral axis of the gamut boundary and the vertex point. Then, points where the planar surface intersect with edge portions of the geometric shapes (e.g., triangles) forming the closed boundary surface are found. The vertex point and intersecting points thus form the hue slice points at the hue angle of the vertex point.

Once the hue slice points are determined for a hue slice, they are ordered prior to being inserted into the look-up table. In more detail, rather than simply ordering the points based on lightness values, an angular altitude ordering process is performed. More specifically, a reference point along the neutral axis between a maximum neutral axis value (e.g., white point) and a minimum neutral axis value (e.g., black point) is determined. From the reference point, an angular altitude for each hue slice point is determined by finding an angle between the neutral axis and each hue slice point. The points are then ordered based on the angular altitude of each point. Lightness and chroma values for each of the ordered hue slice points are then obtained and the hue slice look-up table is populated with the hue slice points. Thus, in an initial stage of generating the table, hue slices for all vertex points on the gamut boundary surface are determined and inserted into the table.

The hue slice look-up table generated in the initial stage is then examined to determine whether a hue angle between adjoining vertex point hue slices is greater than a threshold angular amount. For example, the hue angle of each vertex point hue slice in the table is examined to determine whether more than 5° exists between adjoining slices. If the hue angle between adjoining hue slices is greater than the threshold amount, then additional hue slices are generated to be inserted into the table as follows.

Based on the angle between adjoining vertex point hue slices, a determination is made as to a number of additional hue slices that need to be inserted into the table between the adjoining vertex point hue slices such that the hue angle between slices becomes equal to or less than the threshold amount. For example, if the hue angle between two adjoining vertex point hue slices is 15°, and the threshold angle between slices is 5°, two additional hue slices would need to be inserted into the table between the vertex point hue slices such that the angle between slices would be 5° or less. Then, for each additional hue slice, the hue angle is determined and hue slice points at the hue angle are determined in the same manner as described above with regard to the vertex point hue slices. The hue slice points for each additional hue slice are then ordered and inserted into the table as described above.

As a result of the foregoing process, the hue slice table is variable in size and variable in the number of elements, depending on the number of vertex point hue slices and the number of additional hue slices needed to populate the table such that adjoining slices fall within a desired hue angle threshold. As such, each maximum chroma point along the gamut boundary surface, as well as other vertex points of interest will have a hue slice in the table, thereby forming a more accurate representation of the gamut boundary.

Another aspect of the invention relates to extraction of hue slices from the table. According to this aspect of the invention, when, for example, an input color is to be mapped, the hue angle of the input color is obtained and compared with the table to determine whether a hue slice already exists in the table at the same hue angle, or if a hue slice already exists in the table at a hue angle within a threshold angular amount of the input color hue (e.g., +/−0.5°). If a hue slice meeting the foregoing criteria is already present in the table, then that hue slice is extracted from the table and is utilized in the mapping. However, if a hue slice meeting the foregoing criteria does not already exist in the table, then a new hue slice is determined and extracted from the table as follows.

The new hue slice is determined by obtaining, from the look-up table, two adjoining hue slices on each side of the hue angle of the input color. A linear interpolation process is then performed, preferably using a triangulation algorithm, between hue slice points of the two adjoining hue slices so as to generate new hue slice points for the new hue slice at the hue angle of the input color. Where the interpolation is performed with a triangulation algorithm, the new hue slice points are determined as follows.

First, hue point lists of the two adjoining hue slices, which contain hue points represented by two-dimensional (lightness, chroma) coordinates, are obtained from the table. Utilizing a first point (preferably either the black point or the white point) in each list as a first pair of points (or first point-pair), a first line segment connecting the first point-pair is defined, and a point on the first line segment that is located proportionally along the first line segment with respect to the input color hue angle and the hue angles of the two adjoining hue slices is determined. The newly-interpolated point (a first point of the new hue slice) is then added to a list of points for the new hue slice.

Next, a new point-pair is determined by examining the endpoints of the first line segment connecting the first point-pair and computing a distance between (1) the endpoint of the first line segment on the first hue slice and a next hue slice point in the list of points for the second hue slice, and (2) the endpoint of the first line segment on the second hue slice and a next hue slice point in the list of points for the first hue slice. The smaller of the two computed distances defines the new point-pair (in this case, the second point-pair) and a second line segment is defined connecting the two points. Then, a point on the second line segment that is located proportionally along the second line segment with respect to the input color hue angle and the hue angles of the two adjoining hue slices is determined. This second newly-interpolated point (a second point of the new hue slice) is then added to the list of points for the new hue slice.

The foregoing process is then repeated to find a next point-pair utilizing the two endpoints of the second line segment, to compute the distances between each endpoint and a next hue slice point with respect to each endpoint in the list of the opposing hue slice, to define a line segment between the points having the smaller distance, and to find a next hue slice point for the new hue slice by finding a point on the new line segment that is proportionally located as defined above. The same process continues until no more points remain in the lists for the adjoining hue slices. The resulting set of interpolated hue slice points form the new hue slice, which is extracted for use by the color management program. The new hue slice point list may then either be added to the hue slice table, or can be discarded after use.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIGS. 13A to 13F depict an example of generating hue slice points for a new hue slice to be extracted from the look-up table.

DETAILED DESCRIPTION OF THE PREFERRED EMBODIMENTS

Figure 1:
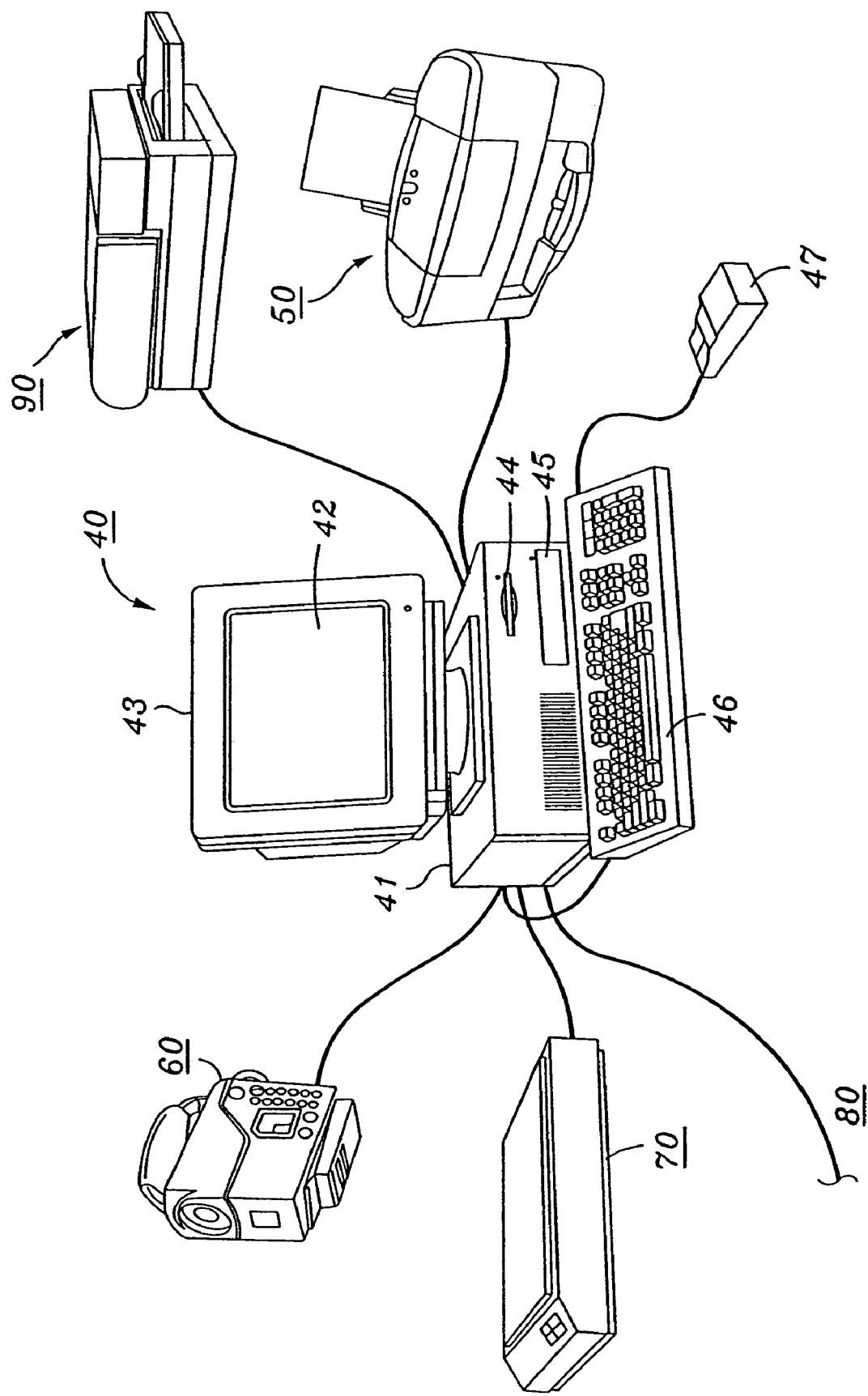
FIG. 1 is a representative view of a computer system in which iterative gamut mapping according to the invention may be implemented.

FIG. 1 depicts an example of a computing environment in which the present invention may be implemented. Computing equipment 40 includes host processor 41 which comprises a personal computer (hereinafter "PC"), preferably an IBM PC-compatible computer having a windowing environment such as Microsoft Windows 98, Windows 2000, Windows Me, Windows XP, or Windows NT, or other windowing system such as LINUX. Alternatively, host processor 41 may be an Apple computer or other non-windows based computer. Computing equipment 40 preferably includes color monitor 43 having a display screen 42, keyboard 46 for entering data and user commands, and pointing device 47, which preferably comprises a mouse for pointing to and for manipulating objects displayed on display screen 42.

Computing equipment 40 preferably also includes a computer-readable memory media such as fixed disk 45 and/or floppy disk drive 44. Floppy disk drive 44 provides a means whereby computing equipment 40 can access information, such as digital image data, computer-executable process steps, application programs, etc. stored on removable memory media. In the alternative, information can also be retrieved through other means such as a USB storage device connected to a USB port (not shown) of computer 40, or through network interface 80. Additionally, a CD-ROM drive and/or a DVD drive (not shown) may be included so that computing equipment 40 can access information stored on removable CD-ROM and DVD media.

Printer 50 as depicted in FIG. 1 is preferably a color bubble jet printer, which forms color images on a recording medium such as paper or transparencies or the like. Printer 90 as depicted in FIG. 1 is a different type of printer than printer 50, such as a color laser printer, which also forms color images on a recording medium such as paper or transparencies or the like. Preferably, printer 50 and printer 90 form color images using cyan, magenta, yellow and black inks, although the present invention can be used with printers and devices which use other colorant combinations. The invention is not limited to being used in conjunction with color printers, but may also be used with other devices that use various colorant combinations, so long as they are capable of being interfaced to computing equipment 40. In addition, digital color scanner 70 is provided for scanning documents and images and sending the corresponding digital image data to computing equipment 40. Digital color camera 60 is also provided for sending digital image data to computing equipment 40. Of course, computing equipment 40 may acquire digital image data from other sources such as a digital video camera, a local area network or the Internet via network interface 80.

Figure 2:
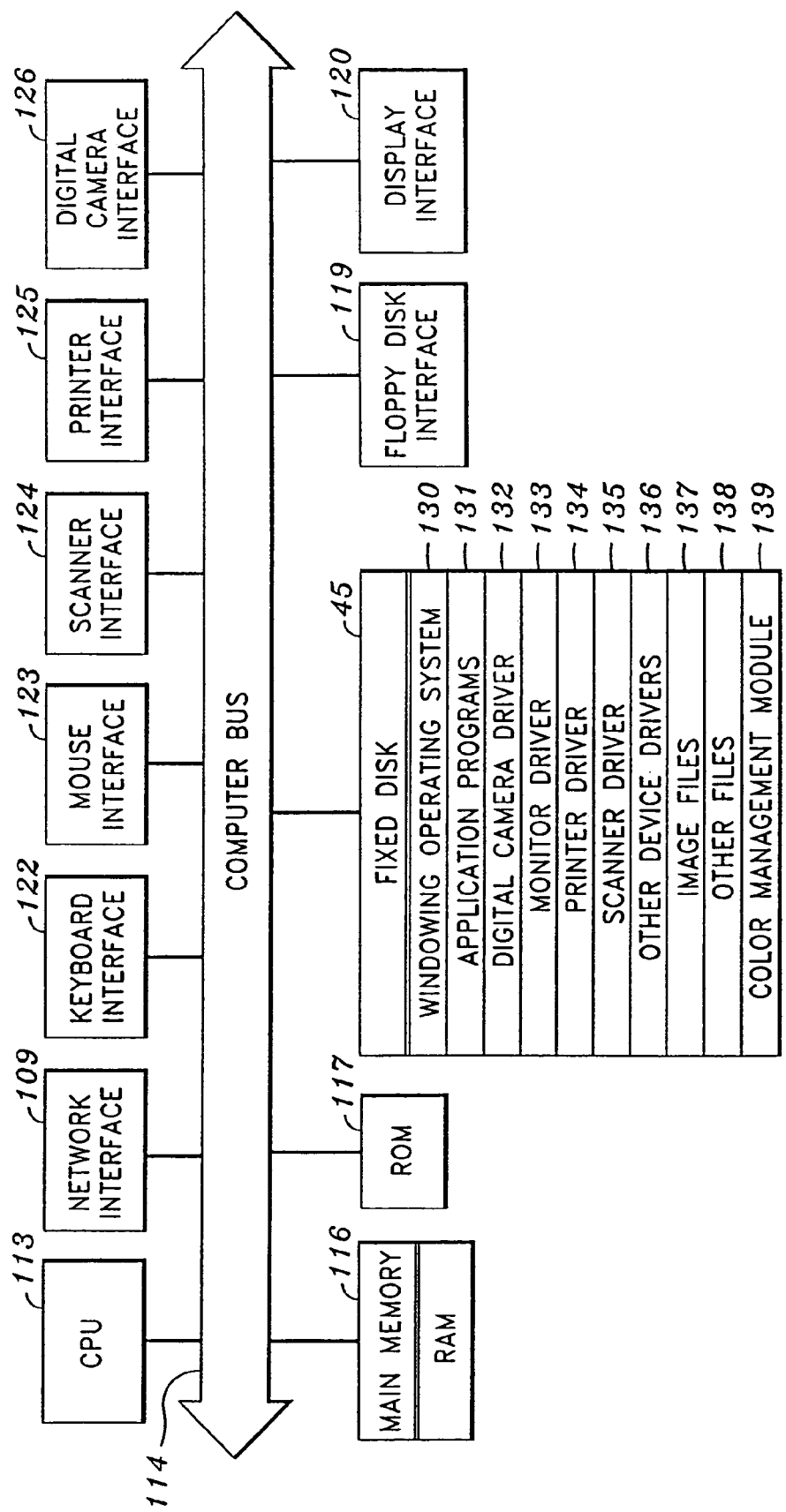
FIG. 2 is a detailed block diagram showing the internal architecture of the computer system shown in FIG. 1.

FIG. 2 is a detailed block diagram showing an example of the internal architecture of host processor 41 of computing equipment 40. As shown in FIG. 2, host processor 41 preferably includes central processing unit (CPU) 113 which interfaces with computer bus 114. Also interfacing with computer bus 114 are fixed disk 45, network interface 109, random access memory (RAM) 116 for use as a main run-time transient memory, read only memory (ROM) 117, floppy disk interface 119, display interface 120 for monitor 43, keyboard interface 122 for keyboard 46, mouse interface 123 for pointing device 47, scanner interface 124 for scanner 70, printer interface 125 for printers 50 and 90, and digital camera interface 126 for digital camera 60.

RAM 116 interfaces with computer bus 114 so as to provide information stored in RAM 116 to CPU 113 during execution of software programs such as an operating system, application programs, such as color management module 142, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as digital color images or other information can be stored in RAM 116, so that the data can be accessed by CPU 113 during the execution of computer-executable process steps that need to access and/or modify the data.

As also shown in FIG. 2, fixed disk 45 preferably contains operating system 130, which is preferably a windowing operating system although other operating systems may be used, and application programs 131, such as a word processing program or a graphic image management program. Fixed disk 45 also contains digital camera driver 132, monitor driver 133, printer driver 134, scanner driver 135, and other device drivers 136. Fixed disk 45 also includes image files 137, other files 138, and color management module 139 which is used to render source image color data (for example, an image displayed on display screen 42) for reproduction on a destination output device, such as printer 50. The color management module 139 will now be described in more detail.

Each device used to output images (e.g., monitors, printers, scanners, etc.) has a reproducible range of colors that it can produce. This range is known as the device's color gamut. Color gamuts differ between different devices, and in particular between different types of devices, as well as between different color spaces. For example, color printers typically have color gamuts that are different from those of color monitors. In addition, different types of color printers, such as ink jet printers and color laser printers, typically have very different color gamuts with respect to one another. Further, a device that uses the Adobe RGB color space has a different color gamut than a device that uses the CMYK color space.

Producible colors for images output by a system such as computer system 40 may fall within (i.e., inside the volume of) a color gamut for one image output device, such as monitor 42, but outside of a color gamut for another image output device, such as printer 50. Images displayed by computer 41 that are to be output to printer 50 often include some colors that are outside of the color gamut for printer 50. In order for printer 50 to output an image that looks substantially the same as the image displayed by computer 41, the out-of-gamut colors must be mapped to colors that fall within the color gamut of printer 50.

Figure 3:
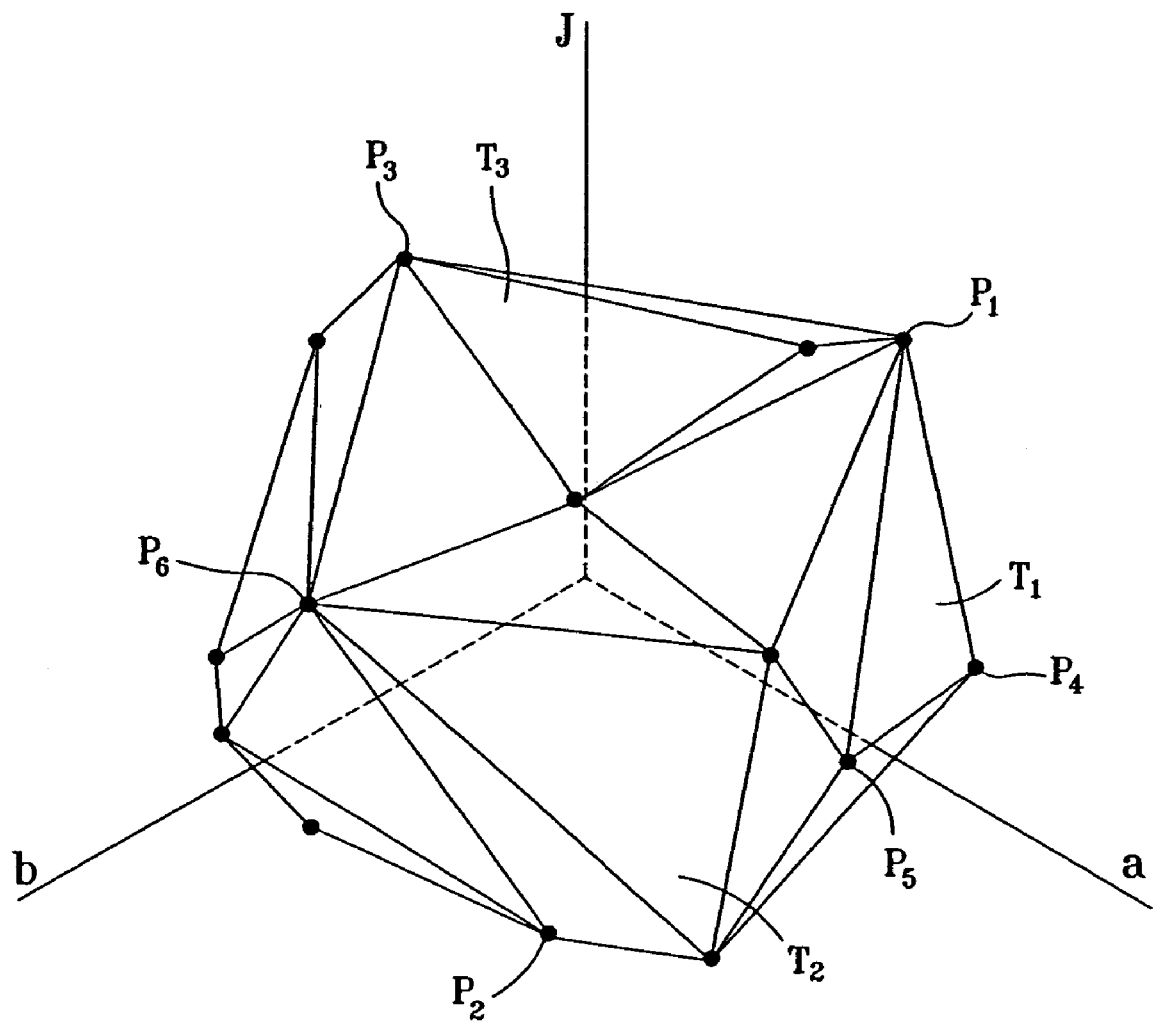
FIG. 3 is a representative view of a three-dimensional convex hull formed by a triangulation algorithm so as to represent a device's color gamut surface.

FIG. 3 is a representative view of a numerical representation of a color gamut surface that may represent a color gamut of, for example, monitor 43 or printer 50. Colors represented by points enclosed by the color gamut surface fall within the color gamut of the device and therefore can be input or output by the device corresponding to the color gamut. Shown in FIG. 3 is a color gamut surface in three-dimensional Cartesian coordinates representing a color space (e.g., Jab color space or Lab color space) which can also be represented in cylindrical coordinates (e.g., Jch or Lch). The color space of the present invention preferably corresponds to the CIECAM02 color space which is defined by the following cylindrical coordinates: J, a scalar lightness value; c, a hue value in degrees; and h, a scalar chroma value. While the invention is preferably employed in conjunction with the CIECAM02 color space, it should be noted that the invention can be implemented in other color spaces, although perceptually linear color spaces are preferred. Also, the color gamut surface need not be mapped in a cylindrical color space.

In FIG. 3, the color gamut surface is preferably generated as a three-dimensional convex hull utilizing a convex hull algorithm. As is known in the art, a convex hull is the smallest convex set that includes a set of points. Virtually any known convex hull algorithm could be used to generate the convex hull (e.g., incremental algorithms, gift wrap algorithms, divide and conquer algorithms, quickhull algorithms, etc.), but the convex hull shown in FIG. 3 is preferably generated utilizing an incremental triangulation algorithm. Thus, as seen in FIG. 3, the surface of the convex hull is preferably formed by co-planar triangles (e.g., triangles $T_1$, $T_2$, $T_3$, etc.). As can also be seen in FIG. 3, and as is known in the art, a convex hull formed of co-planar triangles results in vertex points (e.g., vertex points $P_1$, $P_2$, $P_3$, etc.) formed by the triangles on the surface of the hull. Each co-planar triangle also includes edge portions that form the triangle (e.g., line segment $P_1$-$P_4$, line segment $P_4$-$P_5$, and line segment $P_5$-$P_1$ forming triangle $T_1$). Once the boundary surface has been computed, a hue slice look-up table is generated to represent the boundary surface. The vertex points and edge portions of the triangles on the boundary surface are utilized in generating the hue slice look-up table as will be described below.

A description will now be provided for generating a hue slice look-up table according to the invention. The description that follows for generating the hue slice look-up table will be made with regard to FIGS. 4 through 9. To summarize the processes described therein, hue slice points for hue slices are obtained at each vertex point in the gamut boundary surface (FIGS. 4 through 6), the obtained hue slice points are ordered by angular altitude (FIGS. 7 and 8), and additional hue slices are obtained so as to populate the hue slice table with hue slices meeting a threshold angular differential with respect to one another.

Figure 4:
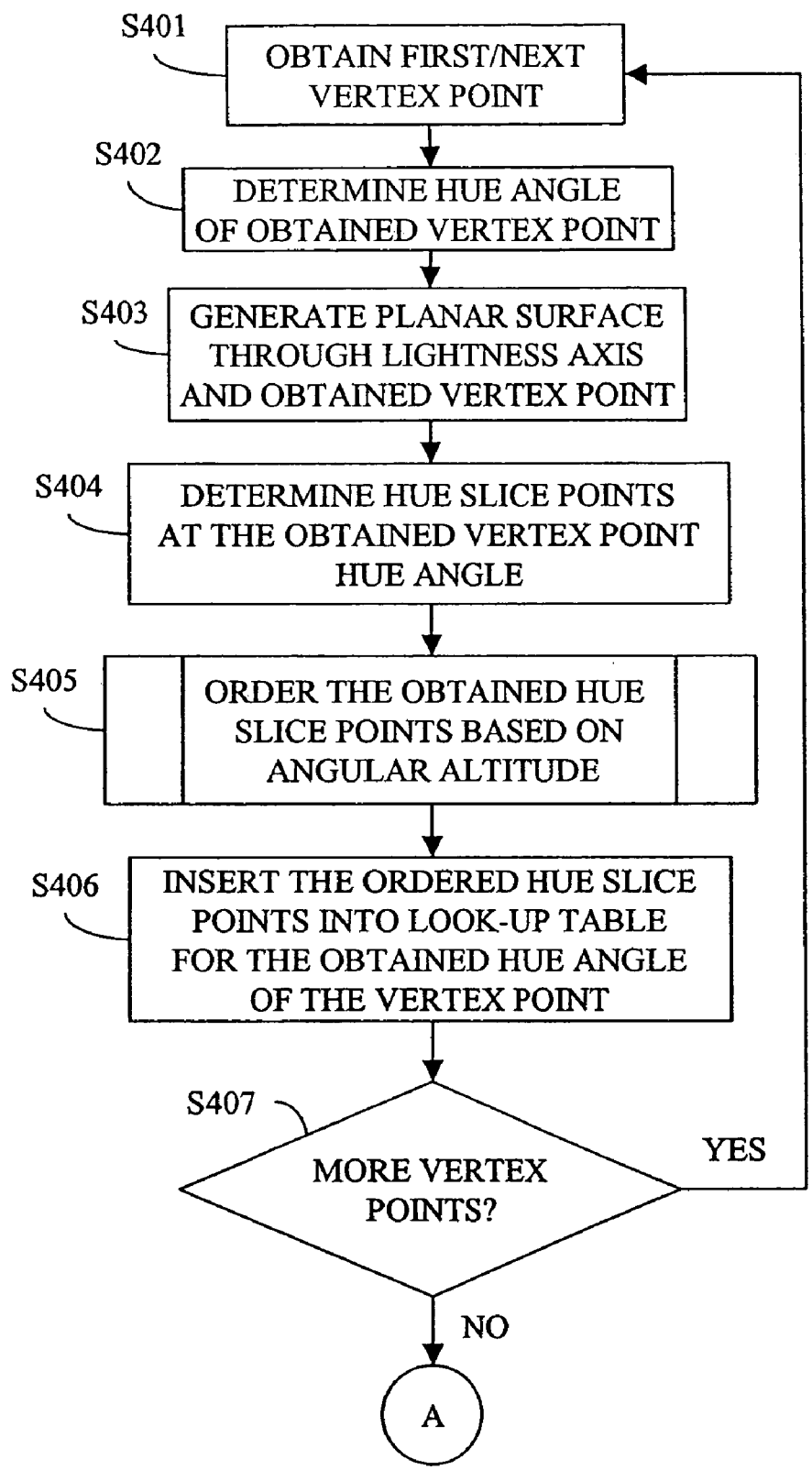
FIG. 4 is a flowchart of process steps for generating vertex point hue slices for a look-up table according to the invention.
Figure 5:
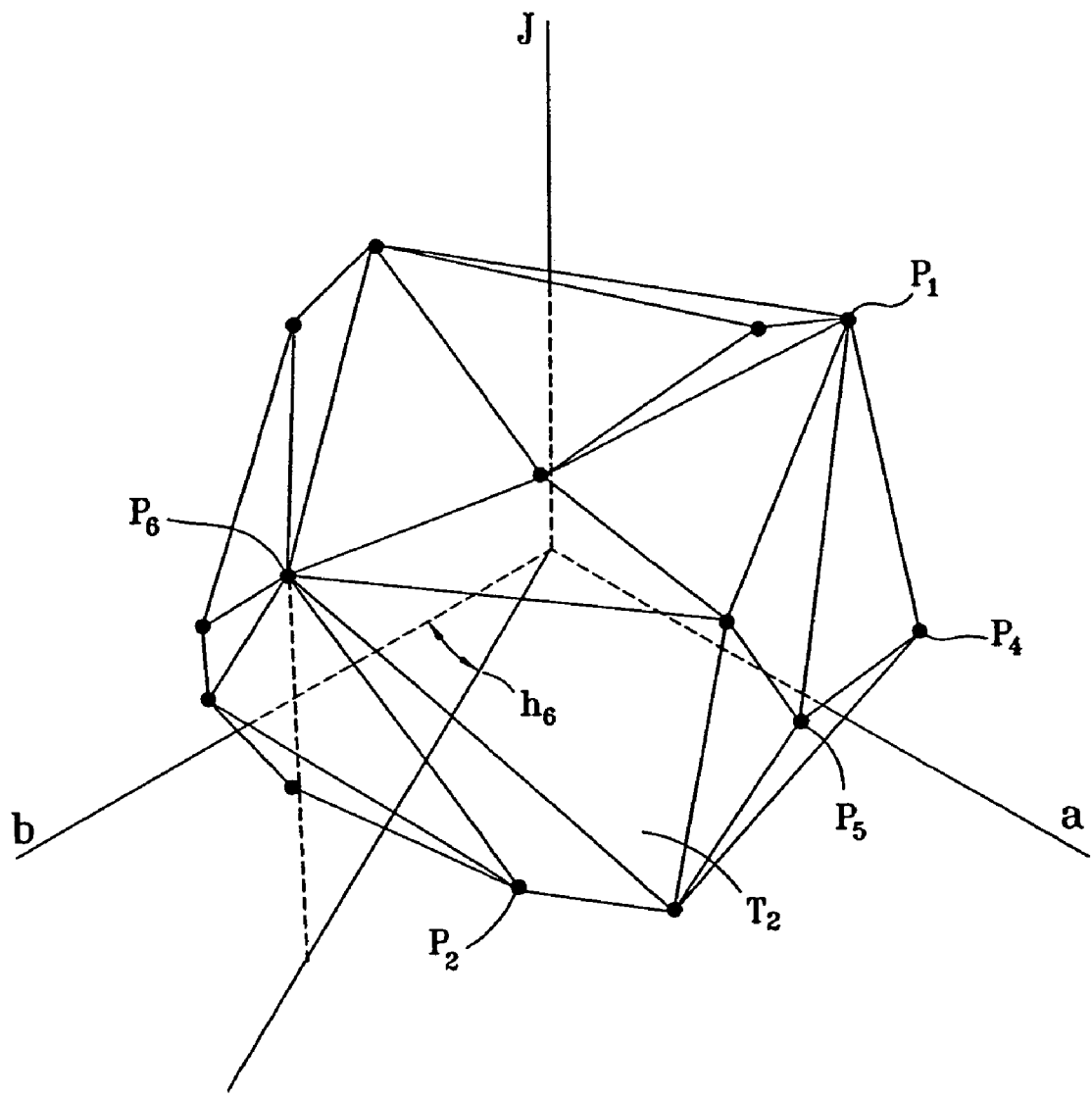
FIG. 5 depicts an example of determining a hue angle for a vertex point on a boundary surface of the convex hull depicted in FIG. 3.

Turning now to FIG. 4, the figure is a flowchart of process steps for generating vertex point hue slices for a hue slice look-up table according to the invention. It should be noted that, for simplicity of the description, the process steps of FIG. 4 comprise processing one vertex point through the entire hue slice generation process before proceeding to another vertex point. However, the process steps could comprise simultaneously performing each step for multiple vertex points instead. In step S401, the first vertex point is obtained from the gamut boundary surface. For instance, any one of vertex points $P_1$, $P_2$, $P_3$, etc. shown in FIG. 3 could be obtained to commence the process steps of FIG. 4. However, it may be preferable to search for vertex points in increasing hue angles beginning with a hue angle of 0°. For instance, beginning at a hue angle of 0°, a 360° sweep about the lightness axis may performed to search for vertex points, with the first vertex point encountered in the sweep being selected as the vertex point to commence the first pass processing of step S401. Once the first vertex point has been obtained, the hue angle for the vertex point is determined (step S402). As an example, FIG. 5 depicts a hue angle ($h_6$) for vertex point $P_6$ of FIG. 3. Then, at the determined hue angle of the vertex point, hue slice points that represent the gamut boundary surface are determined as follows.

Figure 6:
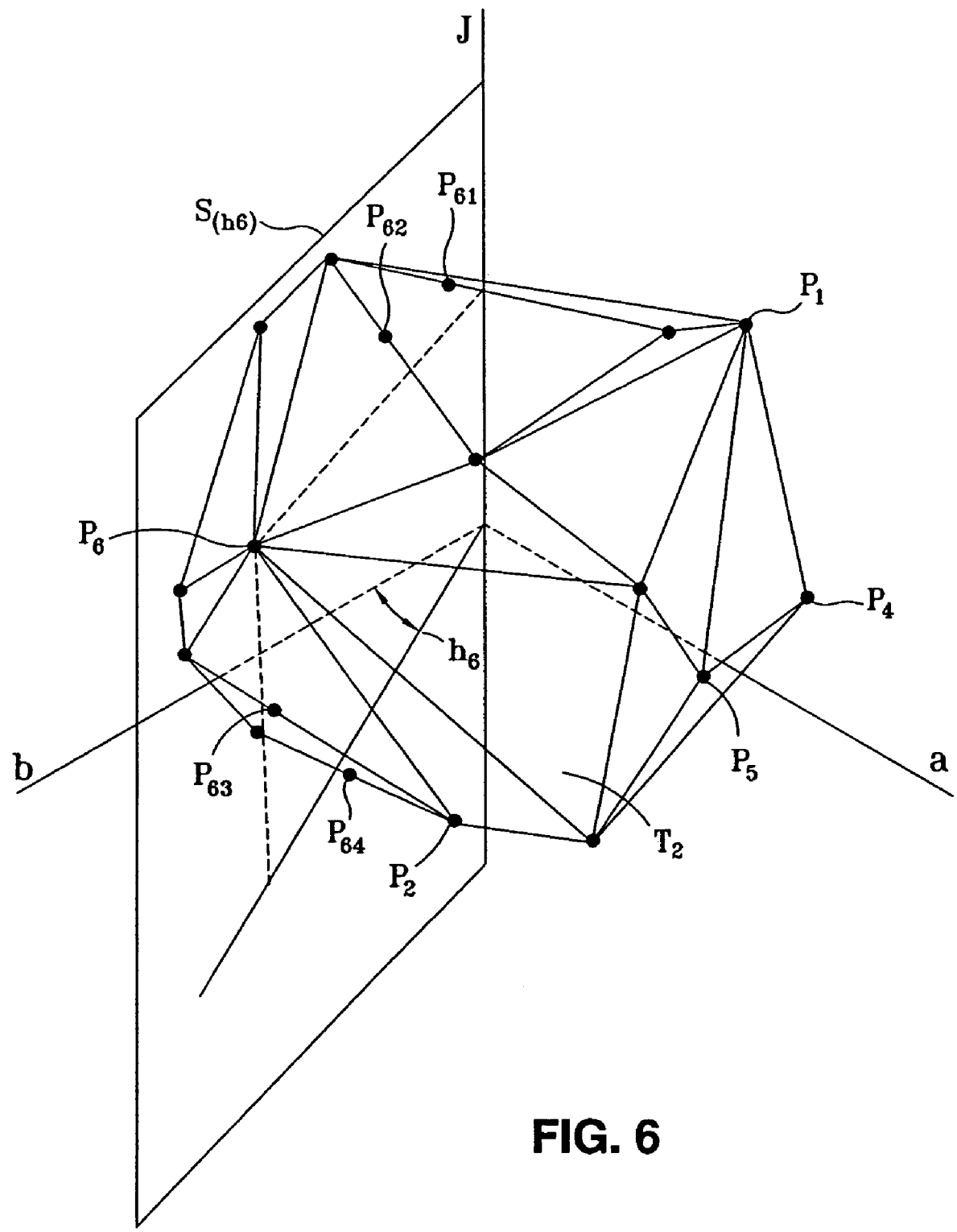
FIG. 6 depicts an example of obtaining hue slice points at a hue angle corresponding to a vertex point on the boundary surface of the convex hull shown in FIG. 3.

In determining the hue slice points, a planar surface is generated through the neutral axis (e.g., the lightness or J axis) and the hue angle of the vertex point (step S403). As an example, FIG. 6 depicts a planar surface ($S_{h6}$) through the neutral (J) axis at the hue angle ($h_6$) of vertex point $P_6$. Then, in step S404, hue slice points are determined for the vertex point hue slice by calculating points where the planar surface ($S_{h6}$) intersects edge portions of the triangles forming the gamut boundary surface. Referring again to FIG. 6, it can be seen that the planar surface ($S_{h6}$) intersects with various edge portions of the surface triangles at intersecting points $P_{61}$, $P_{62}$, $P_{63}$ and $P_{64}$. Thus, intersecting points $P_{61}$, $P_{62}$, $P_{63}$ and $P_{64}$ would be determined as being hue slice points for a hue slice taken at vertex point $P_6$. Once the hue slice points have been obtained, the points are ordered prior to being inserted into the hue slice look-up table (step S405). The ordering process of step S405 will now be described in more detail with regard to FIGS. 7 and 8.

Figure 7:
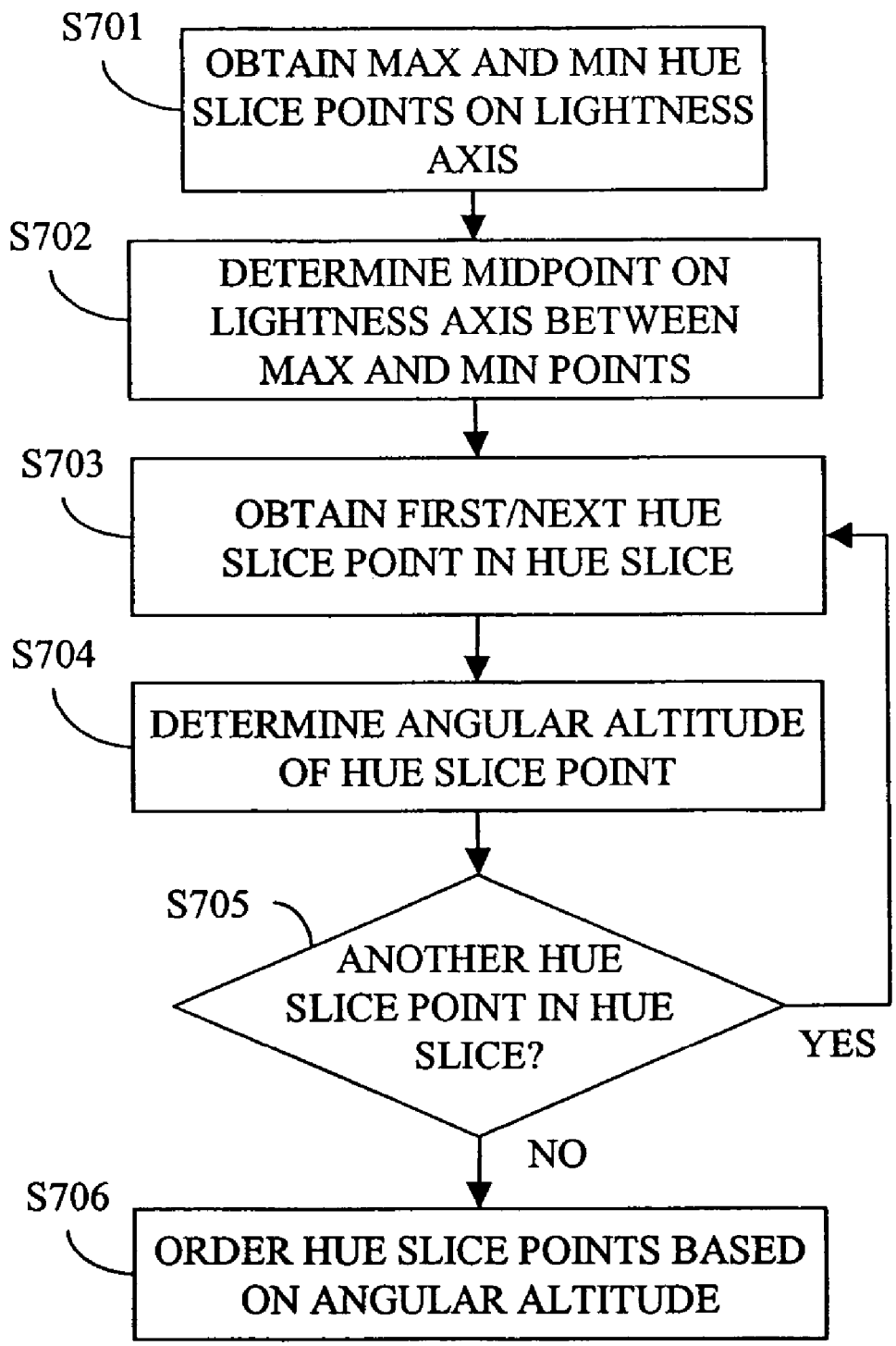
FIG. 7 is a flowchart of process steps for ordering hue slice points based on angular altitude.

FIG. 7 is a flowchart of process steps for ordering the hue slice points based on angular altitude. In more detail, rather than simply ordering the hue slice points based on lightness values, an angular altitude ordering process is performed. In the first step (S701), the maximum and minimum points on the neutral (lightness) axis are obtained, where the maximum point may correspond to the white point and the minimum point may correspond to the black point. Next, a reference point along the neutral axis between the maximum point and the minimum point is determined (step S702). The reference point preferably corresponds to a midpoint between the maximum and minimum values, but any other point along the neutral axis could also be used provided that it is between the minimum and maximum lightness values. For example, the reference point could simply be set to a lightness value of 0.5, or it can be determined as mp=(min lightness+max lightness)/2, where mp=midpoint. From the reference point, an angular altitude for each hue slice point of the hue slice is determined. More particularly, a first hue slice point in the hue slice is obtained (S703), which may be, for example, the minimum point. Then an angular altitude for the obtained point is determined about the reference point between the neutral axis and the point being examined (S704). Then, a determination is made whether or not more hue slice points exist for the hue slice (step S705). If so, then a next hue slice point is obtained (step S703), and the angular altitude of that point is determined (step S704). The process is repeated until all hue slice points in the hue slice have been processed to obtain an angular altitude for each point. Then, based on the determined angular altitudes of each point, the points are ordered (step S706). For instance, the points may be ordered in either ascending or descending angular altitude.

Figure 8:
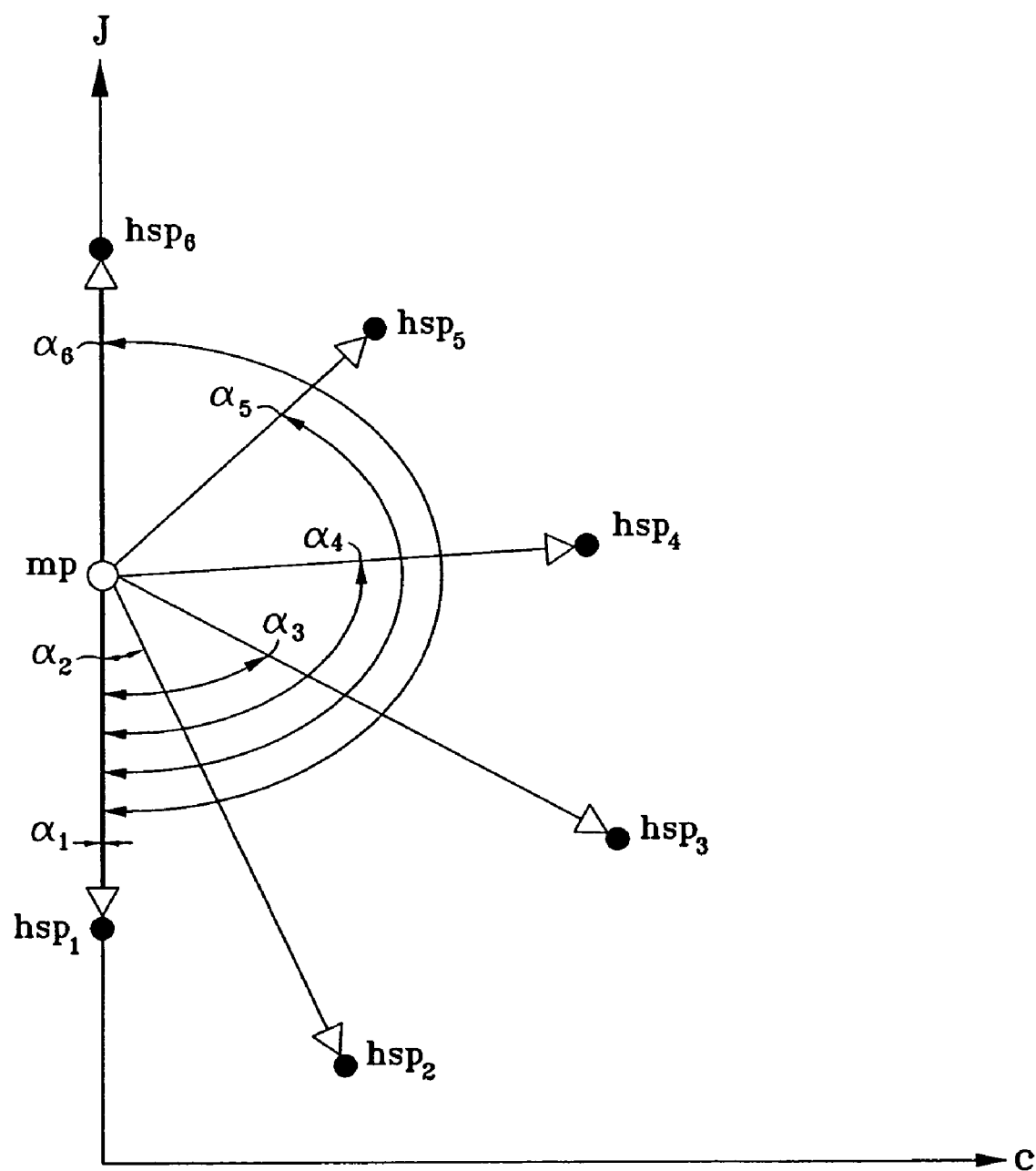
FIG. 8 depicts an example of ordering hue slice points based on angular altitude.

By way of example, as seen in FIG. 8, a first hue slice point selected in step S703 may be hue slice point $hsp_1$. An angular altitude $\alpha_1$ (taken relative to reference point mp) for point $hsp_1$ is determined as 0°. The next point processed in step S703 is hue slice point $hsp_2$, where it is determined that the angular altitude $\alpha_2$ is 17°. Then, hue slice points $hsp_3$, $hsp_4$, $hsp_5$ and $hsp_6$ are processed, sequentially, such that angular altitudes $\alpha_3$, $\alpha_4$, $\alpha_5$, and $\alpha_6$ are determined to be 48°, 95°, 120° and 180°, respectively. Thus, the ordering of the points, when performed based on angular altitude would be, in ascending angular altitude: $hsp_1$, $hsp_2$, $hsp_3$, $hsp_4$, $hsp_5$ and $hsp_6$. In contrast, when the hue slice points are ordered in the conventional method using lightness values, the points would be ordered as: $hsp_2$, $hsp_1$, $hsp_3$, $hsp_4$, $hsp_5$ and $hsp_6$, which may result in an erroneous profile of the gamut boundary surface.

Referring now back to FIG. 4, once the hue slice points have been ordered according to the foregoing, the ordered points are inserted into the hue slice look-up table (step S406) at the hue angle of the vertex point being processed. Lightness (e.g., J or L) and chroma (e.g., a or c) values for each of the ordered hue slice points are obtained when the hue slice points are inserted into the look-up table at the hue angle (e.g., b or h). Thus, the foregoing steps result in the processing of a hue slice for a first vertex point. A search is then performed to determine whether any additional vertex points exist (step S407). For example, as described above, a 360° sweep may be performed to find a next vertex point. If another vertex point is found (YES in step S407), flow returns to step S401 to process that vertex point. The process is repeated until all vertex points on the gamut boundary surface have been processed (NO in step S407). Thus, in an initial stage of generating the hue slice look-up table, hue slices for all vertex points on the gamut boundary surface are generated and inserted into the table. Next, a process will be described with regard to FIG. 9 for populating the hue slice look-up table with additional hue slices between the vertex point hue slices.

Figure 9:
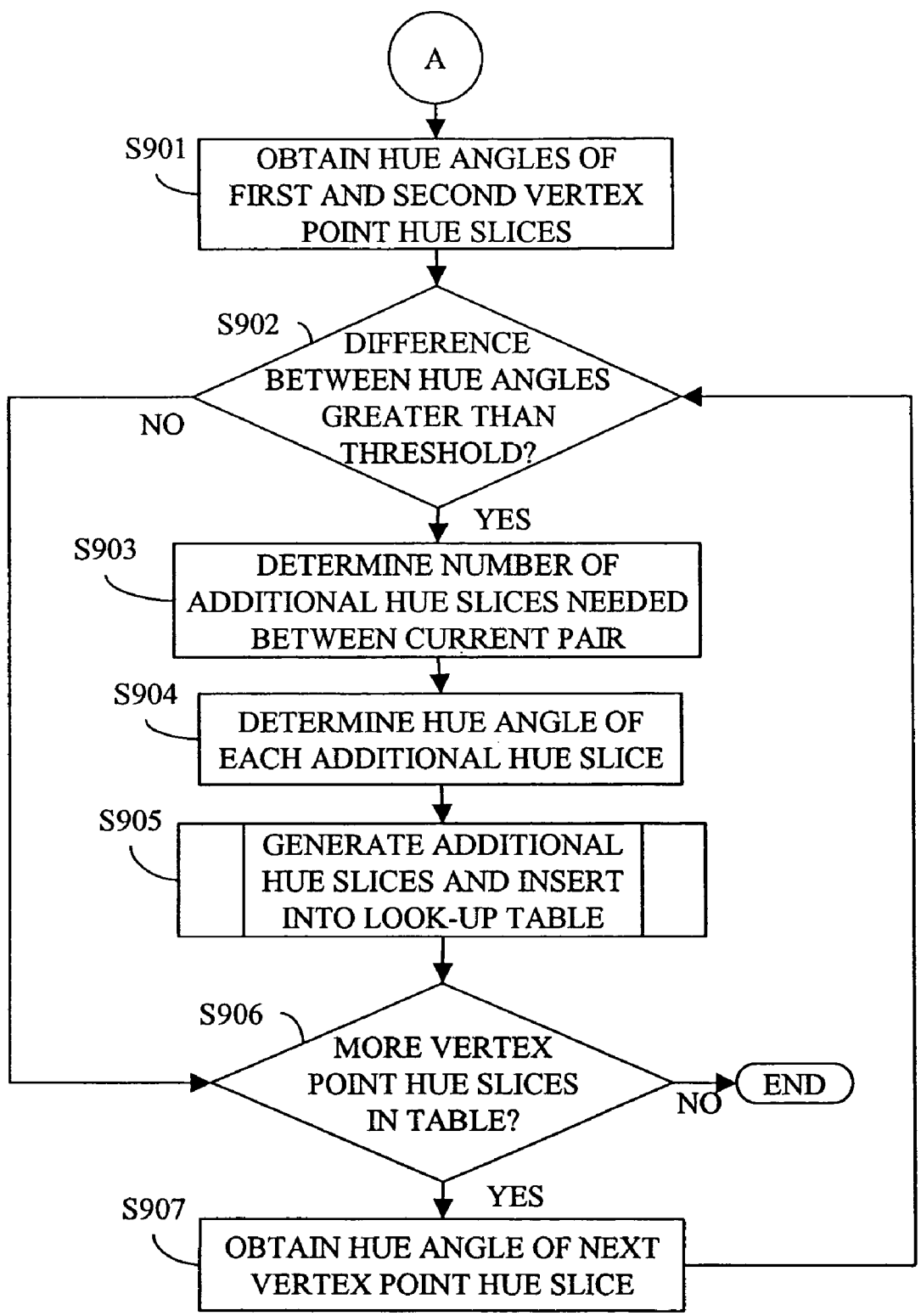
FIG. 9 is a flowchart of process steps for generating additional hue slices between vertex point hue slices.

Referring to FIG. 9, the process steps described therein preferably follow step S407 of FIG. 4. That is, once hue slices for each of the vertex points have been generated and inserted into the look-up table according to the process steps of FIG. 4, the process steps of FIG. 9 are performed to generate additional hue slices to be inserted into the look-up table, if necessary. In FIG. 9, the hue slice look-up table generated with regard to FIG. 4 is examined to determine whether a hue angle between any two adjoining vertex point hue slices is greater than a threshold angular amount. For example, the table may be analyzed in ascending hue angle order to determine whether a first hue angle in the table and a second hue angle in the table (two successive vertex point hue slices) have an angular difference of less than the threshold amount. To this end, the hue angles of the first and second hue slices in the table are obtained (step S901), and in step S902 a determination is made whether or not the hue angle between the two successive hue slices is more than, for example 5°. If the hue angle between the two adjoining vertex point hue slices is not greater than the threshold angular amount, then flow proceeds to step S906 to determine if additional vertex point hue slices are in the table. If so, then the hue angle of the next successive vertex point hue slice (in this case, the third vertex point hue slice) in the table is obtained (step S907) and the difference between the hue angle of the next hue slice (third hue slice) is compared with the previous successive hue slice (the second hue slice) to determine if the hue angle between them is greater than the threshold amount. If the hue angle between all hue slices in the table is equal to or less than the threshold amount, then the flow between steps S906, S907 and S902 would simply continue in a loop until all of the hue angles for each vertex point hue slice in the table have been processed (NO in step S906). However, if the difference between any two successive hue angles is greater than the threshold amount (YES in step S902), then flow proceeds to step S903 to generate additional hue slices between the two successive hue slices.

In step S903, based on the hue angle between the two adjoining vertex point hue slices, a determination is made as to a number of additional hue slices that should be generated and inserted into the hue slice table between the adjoining vertex point hue slices such that the hue angle between each slice becomes equal to or less than the threshold amount. For example, if the hue angle between two adjoining vertex point hue slices is 14°, and the threshold angular amount between slices is 5°, step S903 would determine that two additional hue slices should be generated and inserted into the table between the two vertex point hue slices. Next, for each additional hue slice, the hue angle of each additional slice is determined (step S904). The hue angle of each additional hue slice may be determined in any of various ways. For instance, the total hue angle between vertex point hue slices may be divided equally. In the foregoing 14° example, if the hue angle of one vertex point hue slice is 10° and the hue angle of the other vertex point hue angle is 24°, the hue angle of the two additional hue slices may be determined to be 14.67° and 19.33°, respectively (or equally spaced at 4.67° apart). Alternatively, the hue slice angles may be rounded up or down to the nearest whole number for simplicity, so long as the hue angle between any two successive hue slices is equal to or less than the threshold amount. In this alternative approach, the hue angle of the first additional hue slice may be rounded up to 15° and the second hue angle of the second additional hue slice may be rounded up to 20°, thereby leaving 5° between some of the slices and 4° between the second additional hue slice and the second (24°) vertex point hue slice. Once the hue angles of the additional hue slices have been determined, hue slice points at the determined hue angles are generated, ordered and inserted into the hue slice look-up table (step S905) in the same manner as described above with regard to steps S403 through S406 for the vertex point hue slices. The foregoing process is repeated for all vertex point hue slices in the table which do not meet the threshold angular amount until all vertex point hue slices have been processed (NO in step S906) and any additional hue slices have been generated.

As a result of the foregoing processes, a hue slice table is generated that is variable in size and variable in the number of elements, depending on the number of vertex point hue slices and the number of additional hue slices needed to populate the table such that adjoining hue slices fall within the desired hue angle threshold amount. As such, each vertex point along the gamut boundary surface will have a hue slice in the table and the table will be populated with additional slices, as deemed necessary, to form a more accurate representation of the gamut boundary surface.

Another aspect of the invention relates to extraction of hue slices from the table. This aspect of the invention may be used to supplement the hue slice look-up table, generated as described above, with even further additional hue slices. That is, when a hue slice is to be extracted from the look-up table at a given hue angle, and a hue slice does not exist in the table at the given hue angle or within a threshold angular amount of the given hue angle, a new hue slice is generated at the given hue angle in manner different from that described above and the new hue slice can then be added to table. This aspect of the invention will be described with regard to FIGS. 10 through 13F.

Figure 10:
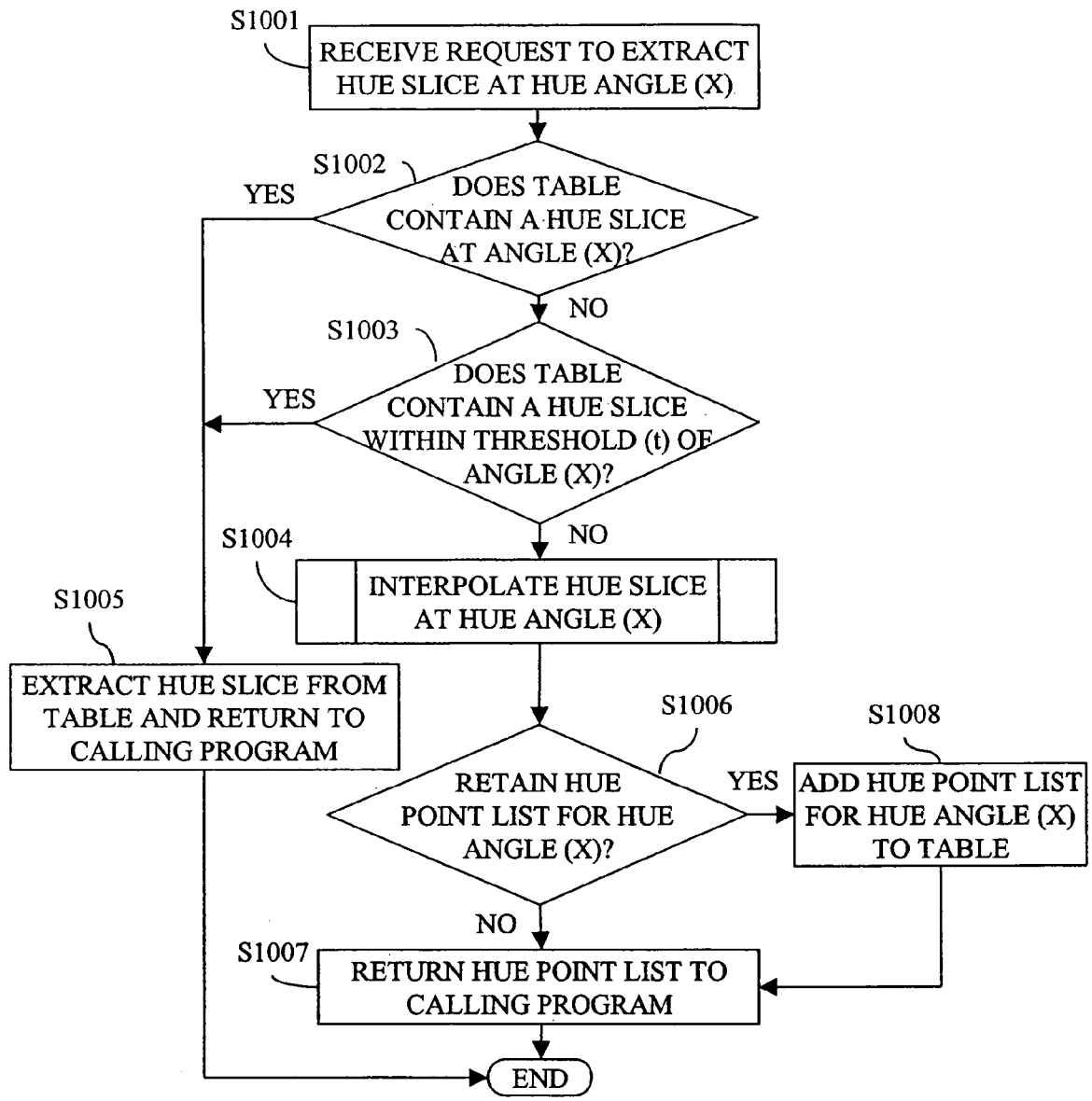
FIG. 10 is a flowchart of process steps for extracting a hue slice from a look-up table.

According to this aspect of the invention, and with reference to FIG. 10, when, for example, an input color is to be mapped, a request is issued by the color management program to extract a hue slice from the look-up table to be used for the mapping (step S1001). Of course, an extraction request can be related to other operations as well and the invention is not limited to extracting a hue slice when gamut mapping is performed. When the request is received, the hue angle (X) of the requested hue slice is obtained and compared with the hue slice look-up table to determine whether a hue slice already exists in the table at the same hue angle (X) (step S1002), or if a hue slice already exists in the table at a hue angle within a threshold (t) angular amount of the requested hue angle (e.g., X+/−t where t=0.5°) (step S1003). If a hue slice does exist at the requested hue angle (X), or a hue slice exists within the threshold amount of the requested hue angle (X+/−t), then that hue slice is extracted from the table and returned to the calling program (step S1005). However, if a hue slice meeting the foregoing criteria does not already exist in the table (NO in both of steps S1002 and S1003), then a new hue slice is generated (interpolated) at the requested hue angle (X) in step S1004 (as described below) prior to being returned to the calling program.

Figure 11:
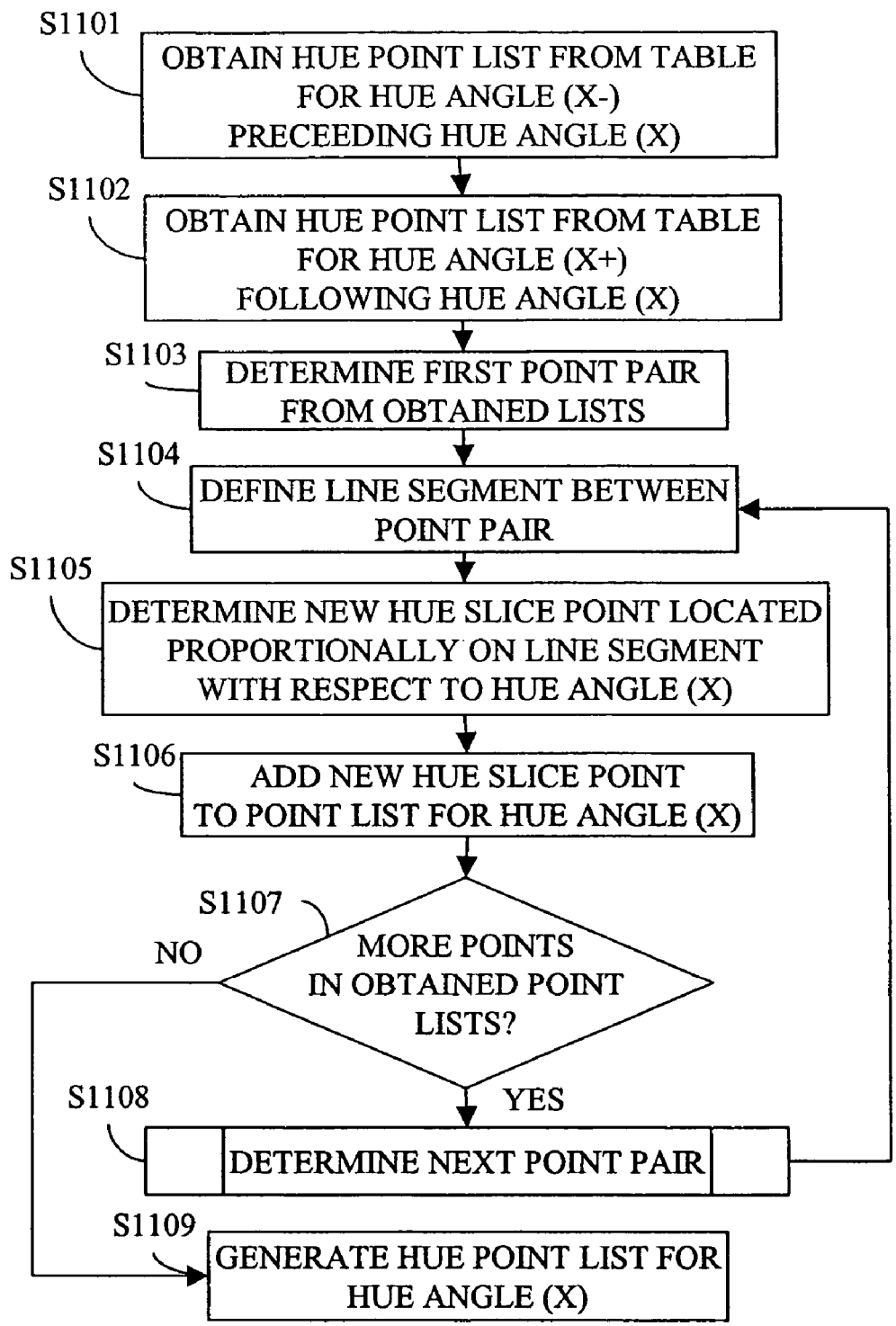
FIG. 11 is a flowchart of process steps for generating a new hue slice to be extracted from the look-up table.
Figure 12:
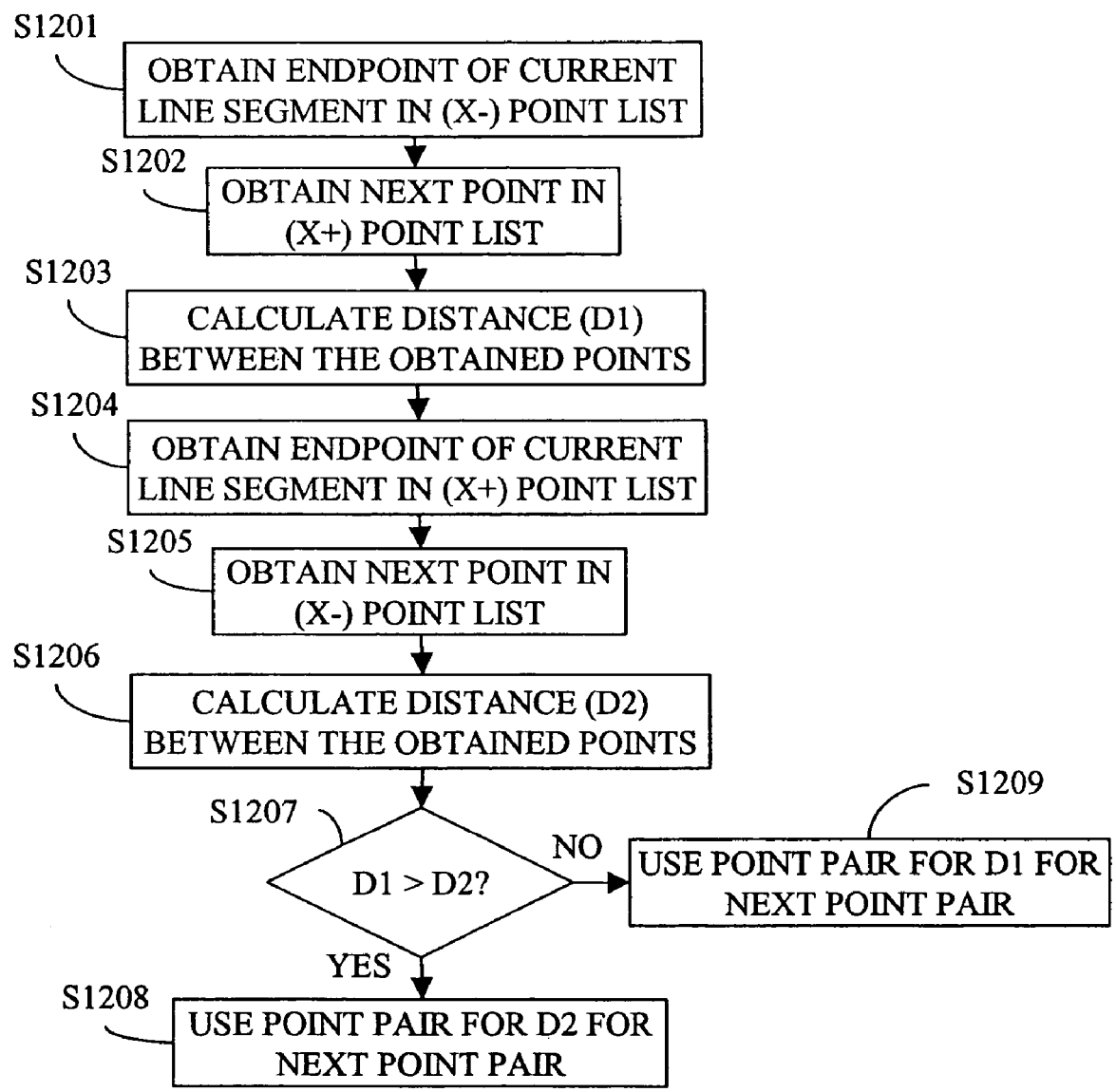
FIG. 12 is a flowchart of process steps for determining a point-pair to interpolate a hue slice point.

FIGS. 11 and 12 are flowcharts of process steps for generating (interpolating) a new hue slice for step S1004. FIGS. 13A to 13F depict an example of how hue slice points for the new hue slice are obtained. It should be noted that, in FIGS. 13A to 13F, the hue slice points depicted therein have two-dimensional coordinate values of lightness (J), which corresponds to the vertical axis in FIGS. 13A to 13F, and chroma (c), which, in FIGS. 13A to 13F, corresponds to a depth of the points in a plane perpendicular to the paper. Of course, the points have a third dimension (h) which is the hue angle of the point within the color gamut. However, in FIGS. 13A to 13F, the hue angle is represented by the horizontal axis since, as will be described below, the hue angle for the new slice is already known (i.e., it is the hue angle of the requested hue slice) and therefore, the values needed to determine each hue slice point for the new hue slice are lightness (J) and chroma (c) values. Once the J and c values have been determined, the hue slice point can be located in a plane at the requested hue angle.

Turning now to FIG. 11, the new hue slice is determined by obtaining, from the look-up table, hue point lists for two adjoining hue slices on each side of the requested hue angle. For example, if the requested hue angle is 12°, and the table includes hue slices at 10° and 15°, the listing of hue slice points for the 10° hue angle (which may be referred to generally as hue angle (X−)) is obtained from the table (step S1101), and the listing of hue slice points for the hue angle 15° (which may be referred to generally as hue angle (X+)) is obtained from the table (step S1102). Once the hue point lists are obtained, a linear interpolation process is performed between the various points in the point lists, preferably using a triangulation algorithm, so as to generate hue slice points for the new hue slice at the requested hue angle. This interpolation process will now be described with regard to steps S1103 through S1108, and FIGS. 12 through 13F.

To begin the interpolation process, a first point-pair between the two hue point lists is determined (step S103). Preferably, the first point-pair comprises the first point in each hue point list. For example, as seen in FIG. 13A, the first point in the (X−) hue angle (10°) for the first point-pair would be point $(X-_1)$ and the first point in the (X+) hue angle (15°) for the first point-pair would be point $(X+_1)$. Utilizing the first point-pair, a first line segment (LS1) connecting the first point-pair is defined (step S104). Then, a first point for the new hue slice at the requested hue angle (X) is determined by locating a point proportionally along the first line segment (LS1) with respect to the requested hue angle and the hue angles of the two adjoining hue slices (step 1105). That is, as seen in FIG. 13A, point $X_1$ is determined along line segment LS1 at the 12° hue angle as the first point in a hue point list for the new hue slice. This newly-interpolated point is then added to the list of points for the new hue slice (step S1106).

Next, a determination is made whether any more points exist in either of the two obtained hue point lists (step S1107). If more points do exist, and in the example depicted in FIG. 13A, points $X-_2, X-_3, X-_4, X-_5$ and $X-_6$ still exist in the hue point list for the 10° hue angle, and points $X+_2, X+_3, X+_4, X+_5$ and $X+_6$ still exist in the hue point list for the 15° hue angle, a new/next point-pair is determined (step S1108). The process of step S1108 (determining a next point-pair) will now be described in detail with regard to FIGS. 12 and 13B to 13F.

In determining the next point-pair, the endpoints of the current line segment (LS1 in the present example) are obtained. It should be noted that each line segment used in generating the new hue slice includes an endpoint from each of the hue point lists such that the line segment connects the two point lists. That is, one of the endpoints for the current line segment is from the (X−) hue angle and the other endpoint of the current line segment is from the (X+) hue angle. Thus, in the present example of FIG. 13B, endpoint $(X-_1)$ is obtained from the (X−) point list. In step S1202, the next hue slice point in the point list for the (X+) hue angle is obtained, which in the present example corresponds to point $(X+_2)$. Then, in step S1203, a linear distance (D1) between points $X-_1$ and $X+_2$ is calculated. The linear distance is preferably calculated as a Euclidean distance (e.g., for N dimensions, $D1=\sqrt{\Sigma_{i=1}^{N}(p_i-q_i)^2}$ where $p_i$ (or $q_i$) is the coordinate of p (or q) in dimension i) between points $X-_1$ and $X+_2$. However, to simplify the Euclidean calculation, it is not necessary to calculate the square root since, as will be described below, the present invention is simply determining which of two distances is shortest, regardless of the actual Euclidean distance. Returning to the flowchart, in like manner, the other endpoint for line segment LS1 is obtained from the (X+) point list $(X+_1)$(step S1204), the next hue slice point in the (X−) point list is obtained (step S1205)(in this case, point $(X-_2)$), and a linear distance (D2) between points $(X+_1)$ and $(X-_2)$ is calculated (step S1206). Then, in step S1207, a determination is made as to which of the two calculated linear distances (D1 and D2) is the shortest. For instance, a determination may be made whether D1 is greater than D2, although any other type of determination may be used instead. If the distance D1 is determined to be the shortest distance, then the point-pair forming the distance D1 (in this case, points $(X-_1)$ and $(X+_2)$) would be determined as being the next point-pair (step S1209). Likewise, if the distance D2 is determined to be the shortest distance, then the point-pair forming the distance D2 (in this case, points $(X+_1)$ and $(X-_2)$) would be determined as being the next point-pair (step S1208). In the present example of FIG. 13B, it can be seen that D2 is the shortest distance and therefore, points $(X-_2)$ and $X+_1)$ are used as the next point-pair.

Figure 13D:
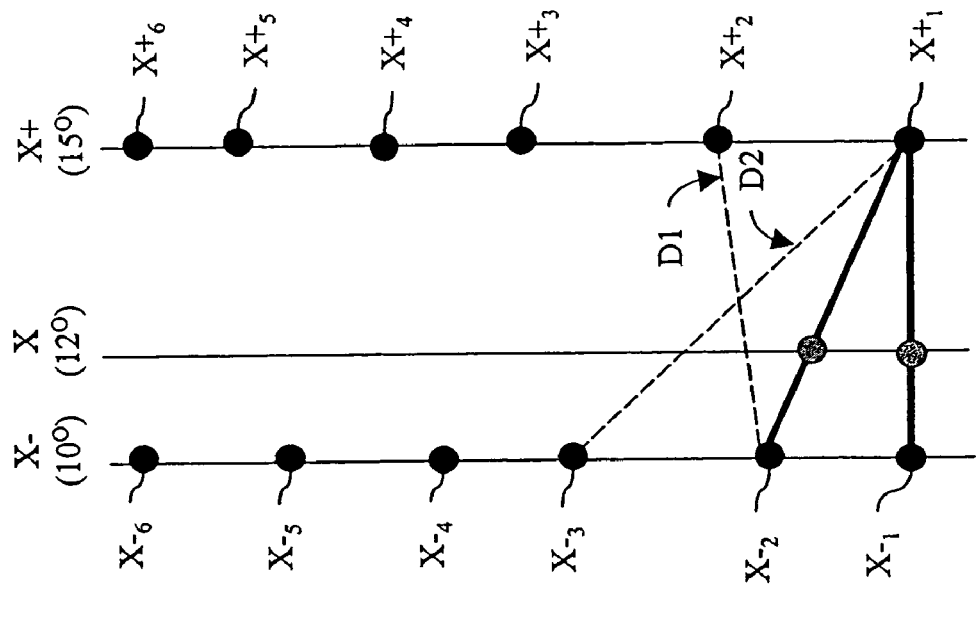
Figure 13C:
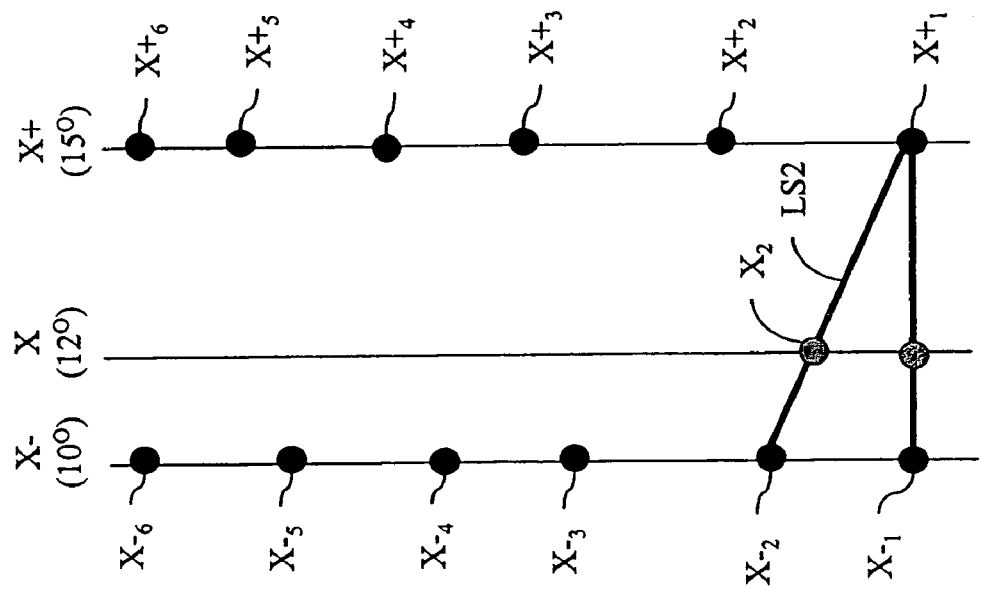

Referring back to FIG. 11, and referring now to FIG. 13C, a second line segment is defined connecting the two points of the next point-pair (step S1104). Thus, line segment LS2 is defined connecting points $(X-_2)$ and $(X+_1)$. Then, as described above, a point on the second line segment LS2 that is proportionally located along the second line segment LS2 with respect to the requested hue angle is determined (step S1105). Thus, hue slice point $X_2$ is determined as the second point in the point list for the new 12° hue slice. This hue slice point $(X_2)$ is then added to the list of points for the new hue slice (step S1106).

Figures 13E, 13F:
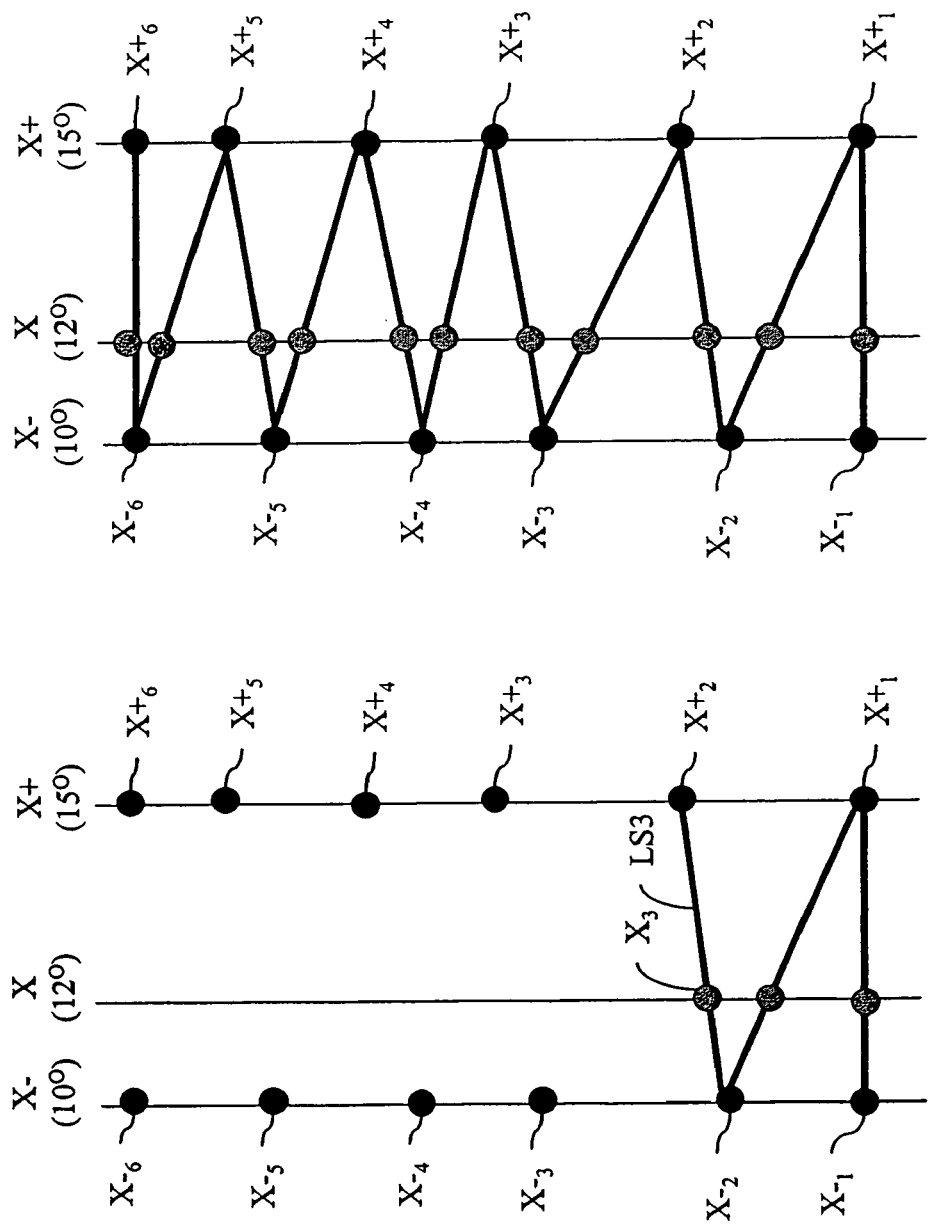
Figure 13G:
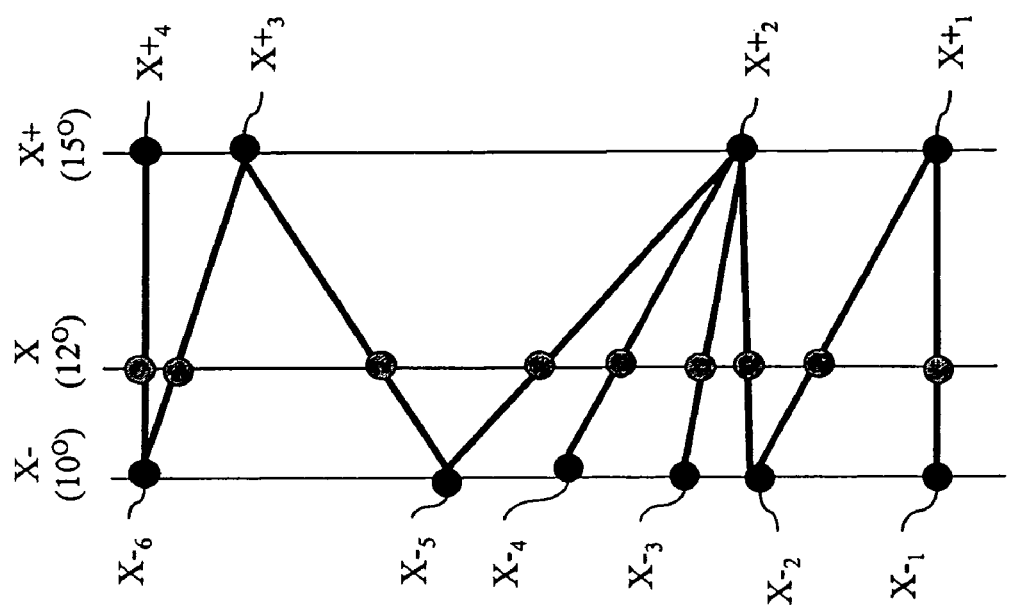
FIG. 13G depicts an example of hue slice points generated in the same manner as FIGS. 13A to 13F, but for two different hue slices.

Continuing with the present example, step S1107 is repeated to determine that additional points still exist in both the (X−) and the (X+) point lists. Step S1108 (the process steps of FIG. 12) is repeated to determine distance D1 between points $(X-_2)$ and $(X+_1)$, and distance D2 between points $(X-_2)$ and $(X+_2)$, and to determine that distance D1 is shorter than D2 and thus points $(X-_2)$ and $(X+_2)$ are the next-point pair (see FIG. 13D). Then, returning again to step S1104, a third line segment LS3 is defined between points $(X-_2)$ and $(X+_2)$, new hue slice point $X_3$ is determined (step S1105)(see FIG. 13E), and the new point $(X_3)$ is added to the point list for the 12° hue slice. The foregoing process is continually repeated until no more points exist in either point list (NO in step S1107). With the foregoing process having been completed, new hue slice points for the point list of the 12° hue angle of the present example may be determined as seen in FIG. 13F. It should be noted that, although FIG. 13F depicts a zig-zag type pattern of line segments to determine the hue slice points, as seen in FIG. 13G, depending on the shortest distances determined between points, a fan-shaped pattern may result instead. That is, one point in a point list may form multiple line segments with different points in the opposing list (e.g., point $X+_2$ forms line segments with points $X-_2, X-_3, X-_4$ and $X-_5$). Once the hue slice points for the point list of the requested hue angle have been obtained, the hue point list is generated (step S1109) and step S1004 is complete.

Returning again to FIG. 10, once step S1004 is completed and the hue point list for the new hue slice at hue angle (X) has been generated, a determination may be made as to whether or not the point list for the new hue slice should be retained (step S1006). If it is determined that the point list should not be retained, then the hue point list is simply returned to the calling program for use without being added to the table. However, if it is determined that the point list for the new hue angle should be retained in the table, then the point list is added to the hue slice table (step S1008) and a copy of the point list is returned to the calling program for use (step S1007). It should be noted that, although the hue point list may not be added to the table in steps S1006 and S1007, the calling program may later decide to add the point list to the table and the point list may be added to the table at that time.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method of generating a hue slice look-up table for a color management system, wherein colors are represented in a color appearance space, comprising the steps of:
    obtaining each of a plurality of vertex points on a gamut boundary surface formed by geometrical shapes and determining a hue angle for each of the obtained vertex points;
    obtaining hue slice points for hue slices at each corresponding vertex point hue angle by determining points where edge portions of the geometric shapes forming the boundary surface intersect the hue angle;
    ordering the hue slice points of each hue slice corresponding to each hue angle by determining an angular altitude of each hue slice point relative to a reference point along a neutral axis; and
    populating the hue slice look-up table with vertex point hue slices at the corresponding vertex point hue angles by inserting the sorted hue slice points into the hue slice look-up table.

2. The method according to claim 1, further comprising evaluating the populated hue slice look-up table to determine whether a hue angle between adjoining vertex point hue slices is greater than a threshold angular amount, and
    in a case where it is determined that the hue angle is greater than the threshold amount, performing the steps of:
        determining a number of additional hue slices to be inserted into the look-up table between the adjoining hue slices such that the hue angle between hue slices becomes equal to or less than the threshold amount;
        for each additional determined hue slice, determining the hue angle of the hue slice; and
        at each determined hue angle of each additional hue slice, obtaining hue slice points for each new hue slice at the corresponding hue angle by determining points where edge portions of the geometric shapes forming the boundary surface intersect at the hue angle, ordering the hue slice points of each new hue slice corresponding to each new hue angle by determining an angular altitude of each hue slice point relative to the reference point along the neutral axis, and populating the hue slice look-up table with the new hue slices at the corresponding new hue slice hue angles by inserting the sorted new hue slice points into the hue slice look-up table.

3. The method according to claim 1, wherein, in the ordering step, the angular altitude determination comprises determining an angle, about the reference point, between the neutral axis and each hue slice point, and the points are ordered according to their determined angle.

4. The method according to claim 1, wherein the geometrical shapes forming the gamut boundary comprise triangles.

5. The method according to claim 1, wherein the reference point is a point on the neutral axis located between a maximum point (max) and a minimum point (min) on the neutral axis.

6. The method according to claim 5, wherein the reference point is located on the neutral axis at a lightness value of 0.5.

7. The method according to claim 5, wherein the reference point is located on the neutral axis at a lightness value equal to (min+max)/2.

8. The method according to claim 1, wherein if extraction of a hue slice from the generated table is requested at a given hue angle, and if it is determined that the hue slice look-up table does not include a hue slice at the given hue angle, or does not include a hue slice at a hue angle within a threshold angular amount of the given hue angle, a new hue slice is generated at the given hue angle for the look-up table by performing the steps of:
    obtaining, from the look-up table, two hue slices at hue angles that adjoin the given hue angle;
    performing a linear interpolation process between hue slice points of the two adjoining hue slices so as to generate hue slice points at the given hue angle for the new hue slice, wherein the linear interpolation process comprises the steps of:
        a) obtaining hue point lists of the two adjoining hue slices, which contain hue points represented by two-dimensional coordinates;
        b) defining a first point-pair comprising a first point in each list and defining a first line segment connecting each point of the first point-pair;
        c) determining a point on the first line segment that is located proportionally along the first line segment with respect to the given hue angle and the hue angles of the two adjoining hue slices, thereby defining a first point of the new hue slice, and adding the determined point to a list of points for the new hue slice;
        d) determining a next point-pair to be used for defining a next line segment, the next point pair being determined by computing a distance between (1) an endpoint of an immediately preceding determined line segment for the first hue slice and a next hue slice point in the list of points for the second hue slice, and (2) an endpoint of the immediately preceding determined line segment for the second hue slice and a next hue slice point in the list of points for the first hue slice, wherein a smaller one of the two computed distances defines the next point pair;
        e) defining the line segment connecting the two points of the next point-pair;
        f) determining a point on the next line segment that is located proportionally along the next line segment with respect to the given hue angle and the hue angles of the two adjoining hue slices, thereby defining a next point of the new hue slice;
        g) adding the determined next point to the list of points for the new hue slice; and
        h) repeating steps d) through g) until no more points are left in the point lists of the first and second hue slices, wherein the resulting list of points for the new hue slice defines the new hue slice at the given hue angle.

9. The method according to claim 8, wherein the distance is one of a Euclidean distance or a Euclidean distance squared.

10. The method according to claim 8, wherein the new hue slice is added to the look-up table.

11. The method according to claim 8, wherein the new hue slice is extracted in response to the request.

12. The method according to claim 1, wherein the color appearance space is CIECAM or CIELAB.

13. A method of extracting a hue slice from a hue slice look-up table for a color management system, wherein colors are represented in a color appearance space, comprising the steps of:

receiving a request for extraction of a hue slice from the look-up table at a given hue angle;

determining whether a hue slice exists in the look-up table at the given hue angle, or at a hue angle within a threshold angular amount of the given hue angle;

in a case where it is determined in the determining step that a hue slice does exist in the table, extracting the hue slice from the look-up table; and in a case where it is determined in the determining step that a hue slice does not exist in the table, performing the steps of:

obtaining, from the look-up table, two hue slices at hue angles that adjoin the given hue angle;

performing a linear interpolation process between hue slice points of the two adjoining hue slices so as to generate hue slice points at the given hue angle for the new hue slice, wherein the linear interpolation process comprises the steps of:

a) obtaining hue point lists of the two adjoining hue slices, which contain hue points represented by two-dimensional coordinates;

b) defining a first point-pair comprising a first point in each list and defining a first line segment connecting each point of the first point-pair;

c) determining a point on the first line segment that is located proportionally along the first line segment with respect to the given hue angle and the hue angles of the two adjoining hue slices, thereby defining a first point of the new hue slice, and adding the determined point to a list of points for the new hue slice;

d) determining a next point-pair to be used for defining a next line segment, the next point pair being determined by computing a distance between (1) an endpoint of an immediately preceding determined line segment for the first hue slice and a next hue slice point in the list of points for the second hue slice, and (2) an endpoint of the immediately preceding determined line segment for the second hue slice and a next hue slice point in the list of points for the first hue slice, wherein a smaller one of the two computed distances defines the next point pair;

e) defining the line segment connecting the two points of the next point-pair;

f) determining a point on the next line segment that is located proportionally along the next line segment with respect to the given hue angle and the hue angles of the two adjoining hue slices, thereby defining a next point of the new hue slice;

g) adding the determined next point to the list of points for the new hue slice; and h) repeating steps d) through g) until no more points are left in the point lists of the first and second hue slices, wherein the resulting list of points for the new hue slice defines the new hue slice at the given hue angle; and i) extracting the new slice at the given hue angle.

14. The method according to claim 13, wherein the distance is one of a Euclidean distance or a Euclidean distance squared.

15. The method according to claim 13, wherein the new hue slice is added to the look-up table.

16. The method according to claim 13, wherein the new hue slice is discarded after the extracting step.

17. A computer readable medium having encoded thereon a table representing a color gamut for a device for use in a color management system, wherein colors are represented in a color appearance space, comprising:

data representing a collection of hue slices through a boundary surface of the color gamut, wherein the collection of hue slices comprises entries for vertex point hue slices obtained at each vertex point on the boundary surface of the color gamut, and entries obtained for additional hue slices between adjoining vertex point hue slices, where a number of the additional hue slices is determined such that there is no more than a specified angular difference between each hue slice, wherein, each hue slice is represented by a hue value and a collection of hue slice points each containing a lightness value and a chroma value, and wherein the hue slice points of each hue slice are ordered in the table based on an angular altitude of each point, the angular altitude of each point being determined between a lightness axis of the color gamut and a vector projected from a reference point on the lightness axis to the hue slice point.

18. A computer readable medium having encoded thereon the table according to claim 17, wherein the reference point is located on the lightness axis at a lightness value of 0.5.

19. A computer readable medium having encoded thereon the table according to claim 17, wherein the reference point is located on the lightness axis at a lightness value equal to (min+max)/2.

20. A computer readable medium having encoded thereon the table according to claim 17, wherein the color appearance space is CIECAM or CIELAB.

* * * * *